(12) United States Patent
Schultz et al.

(10) Patent No.: US 7,330,640 B2
(45) Date of Patent: Feb. 12, 2008

(54) DISPLAY OF CLOSED CAPTION AND SUB-PICTURE INFORMATION DURING LIMITED SPEEDUP VIDEO TRICK MODES

(75) Inventors: Mark Alan Schultz, Carmel, IN (US); Ronald Lynn Blair, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1208 days.

(21) Appl. No.: 10/123,558

(22) Filed: Apr. 15, 2002

(65) Prior Publication Data
US 2003/0194213 A1  Oct. 16, 2003

(51) Int. Cl.
H04N 5/91  (2006.01)
(52) U.S. Cl. ............................ 386/95; 386/67; 386/68; 386/69; 386/70
(58) Field of Classification Search .................. 386/68, 386/95
See application file for complete search history.

(56) References Cited

U.S. PATENT DOCUMENTS 5,377,051 A  12/1994  Lane et al. ................ 360/33.1
5,566,174 A * 10/1996  Sato et al. ................. 370/468
5,848,217 A * 12/1998  Tsukagoshi et al. .......... 386/68
5,978,542 A  11/1999  Ting et al. .................... 386/68

FOREIGN PATENT DOCUMENTS

WO  WO 02/32128 A2  4/2002

* cited by examiner

Primary Examiner—Thai Q. Tran
Assistant Examiner—Daniel Tekle
(74) Attorney, Agent, or Firm—Joseph J. Laks; Robert B. Levy

(57) ABSTRACT

The invention concerns a method and apparatus for displaying closed caption information during trick mode playback. A video processor (150) can be configured to delete one or more pictures in a segment of the video presentation that contains at least one picture having one or more NUL characters. A remaining portion of the segment of the video presentation containing the closed caption information can be displayed during playback at a trick mode speed. The segment of the presentation can include, but is not limited to, a group of pictures (GOP). The method can further include the step of determining pictures within GOP containing non-displayable control codes and deleting those pictures containing non-displayable codes. The Video processor provides to a display device a remaining portion of the GOP containing the closed caption information for display at a trick mode playback speed.

18 Claims, 2 Drawing Sheets

DISPLAY OF CLOSED CAPTION AND SUB-PICTURE INFORMATION DURING LIMITED SPEEDUP VIDEO TRICK MODES

BACKGROUND OF THE INVENTION

1. Technical Field

The invention concerns improved trick mode playback, and more particularly to the display of closed captioned information during trick mode playback of a video presentation.

2. Description of the Related Art

Television signals can include an auxiliary signal component, which can represent information other than video and audio program components of a television program. For example, in the United States, NTSC (National Television Standards Committee) television signals include closed caption information. Closed caption refers to text captions that are the written representation of the audio segment of a video presentation or television program, which are embedded in a video signal, but do not form part of the permanently displayed video. Closed caption requires a special decoder to decode and display the closed caption information. When decoded and displayed, closed captioning provides a visible text representation of a television program's audio content, the text being synchronous with the audio content.

The auxiliary information signal component representing closed caption data comprises two bytes of binary closed caption data during the latter half of each occurrence of line 21 of field 1 of the standardized video display. Additional closed caption data and similarly encoded information, such as extended data services (XDS) information, can be included in other line intervals such as line 21 of field 2. The NTSC standard and U.S. law requires that all television receivers in excess of 13 inches to have integrated decoders and circuitry capable of decoding and displaying closed caption information located on line 21 of the vertical blanking interval (VBI) of video signals. For this reason, practically all video presentations, including but not limited to television broadcasts, digital versatile disks (DVDs), video compact disks (CDs) and videotapes now include captioning data.

Although captioning was developed to aid the hearing impaired, captioning can also provide a benefit to non-hearing-impaired viewers as well. Providing captioning for an auxiliary image in a multi-image display, such as picture-in-picture (PIP) or picture-outside-picture (POP) displays, is an example of this type of additional benefit. For example, activating a PIP feature produces a small image representing the content of a PIP program signal to be displayed in a portion of the main picture. However, only the audio program associated with the main picture is processed and coupled to the speakers of the television. The audio content of the PIP signal is lost. Because the audio program is important to the comprehension of a television program, the usefulness of the PIP feature is severely limited by the lack of an associated audio program. An approach to solving this problem is to display captions, i.e., visible text, representing the PIP audio programming portion of the display. However, the closed caption decoder in most television receivers processes only the caption information associated with the main picture, not the PIP signal. Another solution is to provide multiple televisions tuners each with its own captioning decoder.

Notwithstanding, technological advancements in storage media have resulted in the proliferation of video presentations that have been recorded in a digital format for distribution. For example, DVDs can store video presentation such as full-length motion pictures in the well-known MPEG format for distribution. The MPEG formatted presentation stored on the DVD can include closed captioned, as well as subpicture information. Subpicture information refers to the captions, subtitles, menus, animations, and other information that can be flexibly displayed upon demand or on the occurrence of certain events. Unlike the closed captioned information which is an auxiliary component of the video presentation signal, subpicture information is encoded as a separate subpicture data stream, which is distinct from the MPEG video presentation stream. Notably, in an MPEG formatted video presentation stream, the closed caption information is encoded as part of the MPEG video stream. Displayed subpicture information overlays the displayed video presentation and can vary in size from an icon represented by a few pixels, to full screen animation.

During playback of an MPEG formatted video presentation distributed on DVD, trick modes can include speedup or slowdown of normal playback speed to either search for a specific location on the disc or to look at details of a clip that would normally be missed at normal speed. By convention, normal playback speed can be denoted as 1×. Both audio and video trick modes are possible and both can be found on commercially available DVD players. However, conventional methods for playback of captioning information during video trick modes have proved to be problematic. In general, closed captioning information and features are deactivated during trick modes in order to overcome the many problems associated with playback. Notably, since the trick modes playback can include the removal, addition or repetition of video and/or audio frames, it can be difficult to synchronize the closed caption information with the trick mode video and/or audio segment.

Disabling captioning during trick modes is not an entirely satisfactory solution as the caption content can be of interest during such trick modes. Accordingly, it would be advantageous if a DVD player could display caption content in a manner that overcomes the limitations of the prior art and achieves a desirable and worthwhile experience during video trick modes.

SUMMARY OF THE INVENTION

The invention concerns a method and system for displaying closed caption information during video trick mode playback of a video presentation. The method can include the step of identifying one or more pictures in a segment of the video presentation that contains at least one picture having one or more NUL characters. NUL characters are well known in the art. The identified pictures can be deleted from the segment of the video presentation to accomplish trick mode playback of the video presentation. A remaining portion of the segment of the video presentation containing the closed caption information can be displayed during playback at a trick mode speed. The segment of the presentation can include, but is not limited to, a group of pictures (GOP). Methods for determining the number of pictures in a GOP that are to be deleted in order to achieve a selected trick mode playback speed are well known in the art. The method can further include the step of determining the pictures within a GOP containing non-displayable control codes and deleting those pictures containing non-displayable codes. A remaining portion of the GOP containing the closed caption information can be displayed at a trick mode playback speed. The non-displayable code can be any one or more of a display color attribute, font color attribute, and font style attribute.

A further aspect of the invention concerns a method for displaying a closed caption information during video trick mode playback of a video presentation. The method can include deleting one or more pictures from a segment of the video presentation to accomplish trick mode playback of the video presentation. The segment can be a GOP or other suitable grouping of pictures. Subsequently, closed caption information for display during playback of the segment of the video presentation at a trick mode playback speed can be assigned to a remaining portion of the pictures in the segment of the video presentation. The remaining portion of pictures in the GOP to which the closed caption information is assigned can be displayed at a trick mode speed. The method can further include the step of determining which pictures in the GOP contains the non-displayable control codes and deleting those pictures containing non-displayable codes.

A further aspect of the invention concerns a system for displaying closed caption information during video trick mode playback of a video presentation. The system can include processing means for identifying at least one picture in a segment of the video presentation having one or more NUL characters. Means can be provided for deleting the identified pictures from the segment of the video presentation to accomplish video trick mode playback of the video presentation. The system can also include means for displaying a remaining portion of the segment of the video presentation containing the closed caption information at a trick mode playback speed. The segment can be a GOP or other suitable grouping of pictures.

In one aspect of the invention, the system can further include means for determining those pictures within the GOP containing non-displayable control Thai codes and deleting the pictures within the group of pictures containing the non-displayable codes. A displaying means can be configured for displaying a remaining portion of the GOP for the video presentation containing the closed caption information at a trick mode playback speed. The non-displayable code can include, but is not limited to, display color attributes, font color attributes, and font style attributes.

The invention also concerns a system for displaying a closed caption information during trick mode playback of a video presentation. In this regard, the system can include means for deleting at least one picture in a segment of the video presentation to accomplish video trick mode playback of the video presentation. An assigning means can be configured to assign to a remaining portion of the pictures in the segment of the video presentation, closed caption information for display during playback of the segment of the video presentation at a trick mode playback speed. A display means can be configured to display the assigned remaining portion of the segment of the video presentation containing the closed caption information at a trick mode playback speed. The deleting means can further include means for deleting one or more pictures from a group of pictures comprising a segment of the video presentation. A determining means can also be provided for determining the pictures within a GOP containing non-displayable control codes and deleting those pictures containing the non-displayable characters.

DETAILED DESCRIPTION OF THE PREFERRED EMBODIMENTS

The present invention can be used for displaying closed caption information during limited video trick modes in any type of digital video recorded on any suitable digital data storage medium. For convenience, the invention shall be described in the context of a DVD medium utilizing conventional MPEG-1 or MPEG-2 format. However, those skilled in the art will appreciate that the invention is not limited in this regard. Notwithstanding, the digital data storage medium can include any media capable of storing substantial amounts of digital data for retrieval and playback at a subsequent time. As used herein, a storage medium can include, but is not limited to, optical, magnetic and electronic means for storing data. Exemplary digital storage media can include an optical digital versatile disk (DVD), a magnetic hard disk, a personal video recorder (PVR), a magneto-optical disk, a video CD or regular CD, or solid-state memory such as dynamic random access memory (DRAM) or synchronous DRAM (SDRAM).

Figure 1:
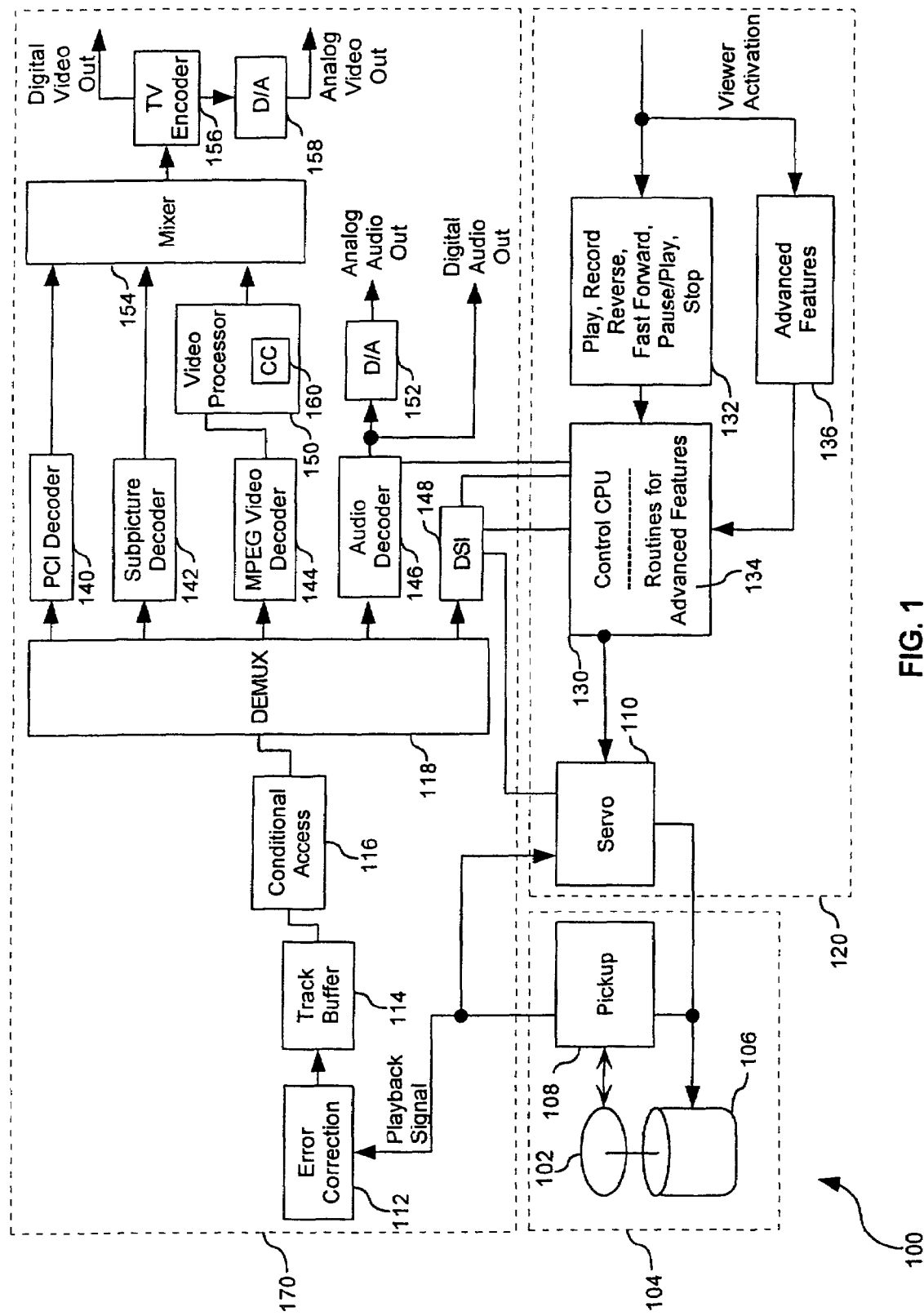
FIG. 1 is a block diagram of a DVD device that can be provided with one or more advanced operating functions in accordance with the inventive arrangements.

A storage medium reader is provided for reading coded digital data from a digital data storage medium. FIG. 1 is a block diagram of an exemplary DVD video player in which the present invention may be implemented. Device 100 can have the capability to read stored data such as MPEG—formatted data from a digital storage medium. Referring to FIG. 1, the storage medium can be a re-writable DVD 102. Device 100 can include a mechanical assembly 104, a control section 120, and an audio/video (A/V) output processing section 170. The allocation of most of the blocks to different sections is self-evident, whereas the allocation of some of the blocks is made for purposes of convenience and is not critical to understanding the operation of the device 100. Importantly, it should be recognized that if the digital data storage medium were a solid-state device, the mechanical assembly 104 would not be necessary to practice the invention. In this case, the coded digital data stored in the digital storage medium can be directly accessed by control CPU 130 and buffered in track buffer 114. Importantly, it should be recognized that the invention is not limited to the arrangements of device 100. In an alternate embodiment, device 100 can be configured as a PVR. In that case, the PVR can include a fixed disk and an MPEG encoder connected thereto. The MPEG decoder can be coupled to the control CPU 130 and error correction circuit 112.

Notwithstanding, the mechanical assembly 104 can include a motor 106 for spinning the DVD 102 and a pickup assembly 108 adapted to be moveable above the surface of the spinning DVD 102. A laser being part of pickup assembly 108 can illuminate data already stored onto the track for playing back video and/or audio program data. For purposes of understanding the invention, it is irrelevant whether the disc is recordable. The laser on the pickup assembly 108 and the motor 106 can be controlled by a servo 110. The servo 110 can also be configured to receive an input playback signal representing data read from spiral tracks on the DVD 102. The playback signal can also serve as an input to an error correction circuit 112, which can be considered part of the control section 120 or part of the A/V output processing section 170.

The control section 120 can include a control central processing unit (CPU) 130. Although the servo 110 is shown located within control section 120, servo 110 can also be considered part of the mechanical assembly 104. Suitable software or firmware can be provided in a memory for the conventional operations performed by control CPU 130. In addition, program routines for the advanced features as described herein can be provided for controlling CPU 130.

A control buffer 132 for viewer activatable functions can be configured to indicate those functions presently available, namely play, reverse, fast forward, slow play, pause/play and stop. The pause function is analogous to pause operation typically found on most videocassette recorders (VCRs). The pause function can have the capability to manually interrupt the play back of a prerecorded presentation. Advanced features buffer 136 can be provided for implementing other advanced playback functions, including control of trick modes as described herein. Playback trick modes can include forward and reverse playback at speeds other than standard 1× playback speed.

The output processing section 170 can include an error correction block 112 and a track buffer or output buffer 114, in which data read from the disc can be buffered and assembled into packets for further processing. The packets can be processed by conditional access circuit 116 that controls propagation of the packets through demultiplexer 118 and into respective paths for video and audio processing. The output of the demultiplexer 118 can include various kinds of packetized elementary streams (PES), including audio, video, presentation control information (PCI), subpicture information, and data search information (DSI) streams. The demultiplexed PCI in the PES can be buffered prior to being decoded by PCI decoder 140.

The subpicture information in the PES can be buffered and decoded by subpicture decoder 142. The demultiplexed video stream in the PES can be decoded by MPEG video decoder 144, for example from MPEG-1 or MPEG-2 formats. Video processor 150 can subsequently process the output from the MPEG decoder 144. It should be recognized that video processor 150 can be a microprocessor or specialized video processing integrated circuit (IC). Video processor 150 can preferably include a closed captioned decoder 160. Closed captioned decoder 160 can be configured to decoded and provide for display, any closed caption information including but not limited to XDS data. Subsequent to processing of the MPEG video, mixer 154 can combine the outputs of the PCI decoder 140, the video processor 150 and the subpicture decoder 142 to form a composite video signal. The output of mixer 154 can thereafter be encoded in a conventional television signal format such as NTSC, SECAM or PAL by the TV encoder 156. The output of the TV encoder 156 can be a digital video signal. However, D/A converter 158 can convert this digital video output signal to an analog video output signal.

The audio portion of the PES can be buffered and decoded by audio decoder 146, for example from MPEG-1 or MPEG-2 formats. The output of the audio decoder 146 can be a digital audio signal. The audio D/A 152 can process digital audio received from the audio decoder 146 and produce an analog audio output signal. Audio decoder 146 preferably includes a frame buffer sufficient for temporarily storing audio frames prior to decoding. The operation of audio decoder 146 can be controlled by control CPU 130. Thus, control CPU 130 can control the operation of the audio decoder, including but not limited to, causing it to selectively drop frames, mute audio for certain frames, insert frames with silence only, and decode only selected frames as control CPU may designate. These actions may be performed in the audio decoder 146. As will be appreciated, however, the invention is not limited in this regards and such processing of the audio frames can be handled by other processing elements inserted before or after the audio decoder 146. Finally, such processing can also be performed directly by the control CPU with communications provided by a suitable system communication bus. Generally all that is necessary in this regard is an audio frame buffer and an ability to selectively remove or modify frames that are to be played, dropped or silenced in accordance with the method that shall hereinafter be described in greater detail.

Closed caption data is typically delivered on line 21 of a 60 Hz video frame. Each frame contains 2 bytes of data for captioning and is sent out in a timely manner to provide text during the correlated picture. Existing DVD players generally output the NTSC signal containing the closed caption information. This information can subsequently be recovered by a television receiver and displayed whenever the closed captioned feature is enabled. During normal playback mode, a closed caption decoder is able to decode each of the two bytes of closed caption data assigned to each frame of video. However, during trick mode playback such as fast forward, pictures are typically dropped from the original video presentation to accomplish trick mode playback. This effectively results in watching the content of the video presentation in a reduced time. Whenever the frames are dropped, the closed caption bytes associated with the dropped frames are also dropped or discarded. This creates very uneven and missing closed caption information, and for this reason, closed caption is typically turned off during trick mode playback.

Additionally, some broadcasters re-map certain portions of a video presentation to ensure that they are delivered within a thirty-minute segment. This practice is prevalent in late night or off-hours televisions programming. The re-mapping of certain portions of the video presentation can permit the insertion of commercial segments. However, during the re-mapping process, frames are typically removed from portions of the video presentation. Consequently, frames containing closed caption information are also dropped from the video presentation.

The invention provides a method for addressing these problems associated with the dropping of frames containing closed captioned data. Generally, closed captioned text is available for each picture within a GOP. Closed caption decoder 160 can be configured to assign the two bytes of closed caption data to each picture that is sent to the TV encoder 156. During trick mode playback, these two bytes of closed caption data are dropped in order to facilitate trick mode playback. These two bytes of closed captioned data represent a control code and are transmitted on either line 21 or line 284.

The control codes include information for controlling the format, location and attributes of the closed captioned characters. The control codes transmitted on line 21 are usually transmitted sequentially for redundancy and reliability. To conserve bandwidth utilization, there is no redundancy on line 284. The first byte of each control code represents characters that that are not displayed, namely non-display characters. The second byte of each control code represents displayable characters which form content of the closed caption. A NUL character can be transmitted whenever there are no control codes being transmitted. When combined with other signals such as the clock signals, the NUL characters can be used to determine what type of closed caption is being implemented. NUL characters are well known in the art.

In one aspect of the invention, the video processor 150 can be configured to examine and prioritize the data contained in the closed caption information. Typically, approximately 50-60% of the closed caption data consists of packets containing NUL characters. This means no new closed caption information is being sent out on 50-60% of the picture frames since the display of text is very slow when compared to the display of pictures for the video presentation. Video processor 150 can be configured to analyze the closed caption information, and in conjunction with control CPU 130, can determine which video frames are the best candidates to be used for trick mode playback. Notably, the video processor 150 can identify one or more pictures in a segment or GOP that contain NUL characters. The video processor 150 can be configured to delete those pictures in a GOP that have NUL characters and the pictures remaining in the GOP can be used for playback at the desired trick mode speed.

By way of example, and without limiting the scope of the invention, "See the fox." is the closed captioned text that is to be displayed on a screen. Since the display of the pictures is significantly faster than the display of closed caption text, an exemplary closed caption display information can be as follows.

| | |
|---|---|
| NUL, S, NUL, e, NUL, e, NUL, space, NUL, t, | 10 characters |
| NUL, h, NUL, e, NUL, space, NUL, NUL, NUL, f, | 10 characters |
| NUL, o, NUL, x, NUL, period, NUL, NUL, NUL, NUL | 10 characters |

For illustrative purposes, the pictures can be arranged as follows. Although two (2) bytes are assigned per picture, it should be readily understood that the invention is not limited in this regard.

| | | |
|---|---|---|
| picture 1 gets | "NUL, S" | bytes |
| picture 2 gets | "NUL, e" | bytes |
| picture 3 gets | "NUL, e" | bytes |
| picture 4 gets | "NUL, space" | bytes |
| picture 5 gets | "NUL, t" | bytes |
| picture 6 gets | "NUL, h" | bytes |
| picture 7 gets | "NUL, e" | bytes |
| picture 8 gets | "NUL, space" | bytes |
| picture 9 gets | "NUL, NUL" | bytes |
| picture 10 gets | "NUL, f" | bytes |
| picture 11 gets | "NUL, o" | bytes |
| picture 12 gets | "NUL, x" | bytes |
| picture 13 gets | "NUL, period" | bytes |
| picture 14 gets | "NUL, NUL" | bytes |
| picture 15 gets | "NUL, NUL" | bytes |

These 30 characters could be sent during a 15 picture GOP where two bytes are assigned to each picture in the GOP. In this case, during trick mode playback, elimination of a picture containing displayable characters can result in the loss of pertinent display information. For example, deletion of picture 5 would result in the loss of the letters "NUL,t" during trick mode playback. Hence, the resulting closed caption during trick mode playback would be "See he fox." instead of the desired "See the fox." Additionally, deletion of picture 1 and picture 5 would result in the loss of the letters "NUL, S" and the letters "NUL, t" during trick mode playback. Consequently, the resulting closed caption during trick mode playback would be "ee he fox." instead of the desired closed caption, namely "See the fox." In accordance with the invention, pictures containing two NUL characters can be preferably deleted. Consequently, if pictures 9, 14, and 15 are deleted, then the resulting closed caption information during trick mode play back would be the desired closed caption, namely "See the fox."

In another aspect of the invention, frames can be dropped independent of the closed caption information. However, video processor 150 can be configured to reassign the closed caption information which gets assigned to those pictures of a GOP that are used during trick mode playback if a video presentation. In this regard, pictures in a GOP can be deleted by video processor 150 independent of the closed captioned information they contain. Closed caption information can be assigned to those pictures remaining in the GOP after pictures have been deleted or dropped from the GOP to achieve trick mode playback. For example, for playback at a trick mode speed of about 2×, the video processor 150 can delete pictures 8 through 15, leaving pictures 1 through 6 for which the displayable characters can be arranged as shown below.

| | | |
|---|---|---|
| picture 1 gets | "S,e" | bytes |
| picture 2 gets | "e, space" | bytes |
| picture 3 gets | "t, h" | bytes |
| picture 4 gets | "e, space" | bytes |
| picture 5 gets | "NUL, f" | bytes |
| picture 6 gets | "o, x" | bytes |
| picture 7 gets | "NUL, period" | bytes |

Advantageously, where all the pictures in the GOP containing NUL characters are deleted, a viewer would not recognize the removal of the NUL characters and all the closed captioned text would be displayed.

In another example, the video processor can delete pictures 2, 3, 5, 6, 8, 9, 14, and 15. Preferably, this can represent dropping most of the B-pictures in an MPEG stream. A B-picture is a bidirectional predicted picture and is well known in the art. If unaltered, the caption information would read "S efox." The video processor can subsequently reassign the closed caption information, namely "See the fox." to the remaining frames as shown below.

| | | |
|---|---|---|
| picture 1 gets | "S,e" | bytes |
| picture 4 gets | "e, space" | bytes |
| picture 7 gets | "t, h" | bytes |
| picture 10 gets | "e, space" | bytes |
| picture 11 gets | "NUL, f" | bytes |
| picture 12 gets | "o, x" | bytes |
| picture 13 gets | "NUL, period" | bytes |

Video processor 150 can preferably include or have access to a buffer of suitable size that can store additional closed captioned information used for effectively reassigning the closed captioned information to those pictures remaining after the pictures have been deleted from the GOP to achieve a desired trick mode playback speed. Advantageously, this buffer can permit the assignment to occur over multiple GOPs, thereby aiding in the retention of most or all of the important closed caption information. Video processor 150 can be configured to identify those pictures in a GOP having certain control codes. These control codes can include, but are not limited to, attributes defining background color, font style, font size and display options for the closed caption. Once identified, pictures containing these non-displayable control codes can be deleted from a segment or GOP. A remaining portion of the GOP containing those pictures with actual displayable text, can be used to display the closed captioned information. Ideally, during trick mode playback, video processor 150 can assign closed caption to those pictures that are to be displayed, thereby preventing the loss of useful displayable closed caption data. Notably, during trick mode playback, lip synchronization is generally not required. Consequently, any delay or advancement of the closed caption data would have a minor effect on the content of the presentation.

Figure 2:
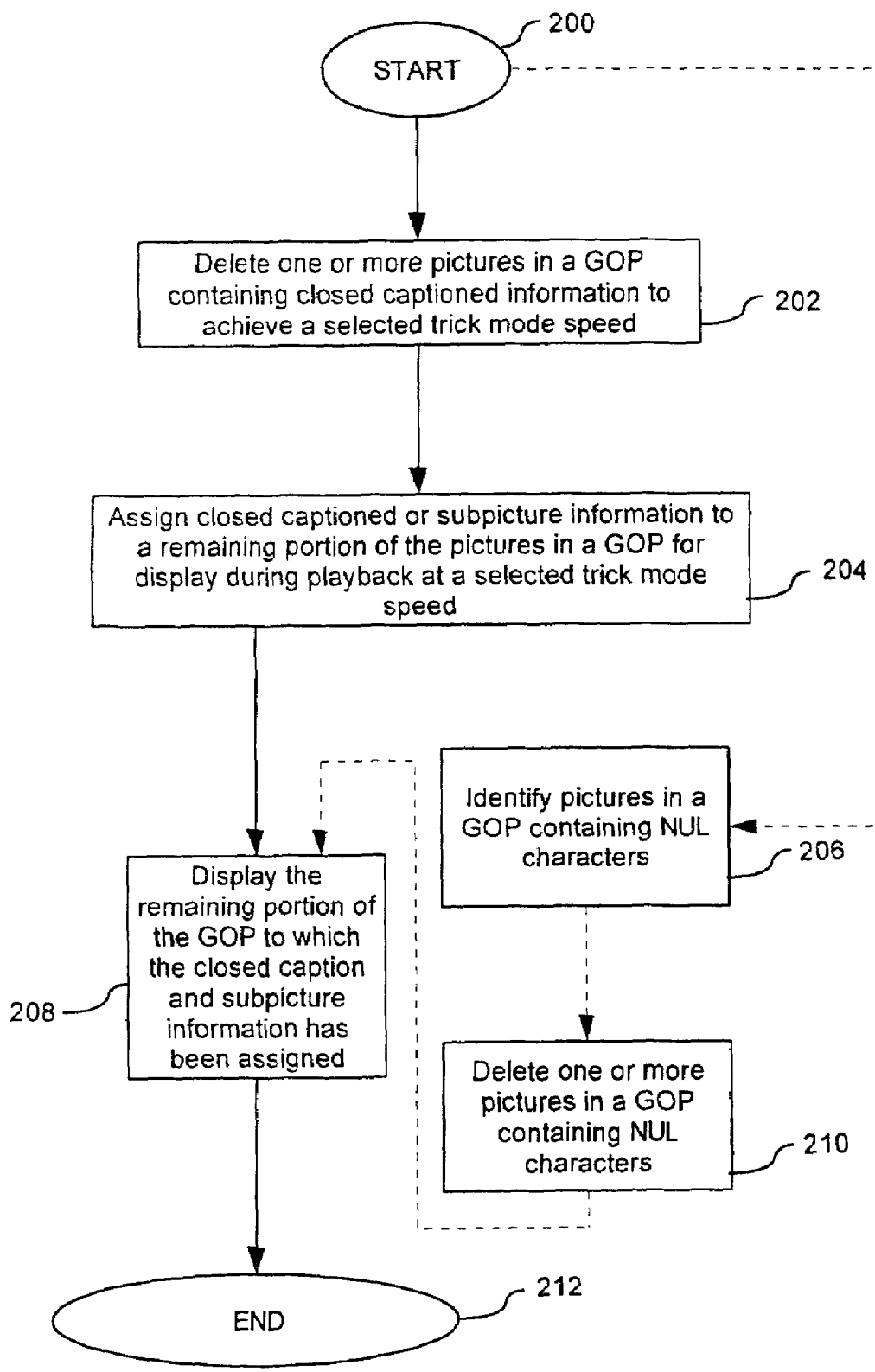
FIG. 2 is a flowchart that is useful for understanding the inventive arrangements as implemented in an exemplary media player such as device 100 of FIG. 1.

FIG. 2 is a flowchart that is useful for understanding the inventive arrangements as implemented in an exemplary media player such as device 100 of FIG. 1. The steps of FIG. 2 can be executed by video processor 150 and/or control CPU 122. Referring to FIG. 2, subsequent to start step 200, either step 202 or step 206 can be executed. If step 202 is executed, one or more pictures in a GOP containing closed captioned information can be deleted to achieve a selected trick mode speed. Subsequently, in step 204, video processor 150 can assign closed captioned information to a remaining portion of the pictures in a GOP for display during playback at a trick mode speed. Subsequent to step 204, either step 206 or step 208 can be executed. In step 208, a remaining portion of the GOP to which the closed caption information has been assigned can be displayed and the process can end in step 212. Step 206 can either be executed subsequently to executing either step 200 or step 206. In any event, during execution of step 206, video processor 150 can identify those pictures in a GOP containing NUL characters. Subsequently, video processor 150 in step 210 can delete those identified pictures. In step 208, a remaining portion of the GOP to which the closed caption information has been assigned can be displayed. Execution can terminate at the end step 212.

In light of the forgoing description, the present invention can be realized in hardware, software, or a combination of hardware and software. Machine readable storage according to the present invention can be realized in a centralized fashion in one computer system, for example the control CPU 130, or in a distributed fashion where different elements are spread across several interconnected computer systems. Any kind of computer system or other apparatus adapted for carrying out the methods described herein is acceptable.

Specifically, although the present invention as described herein contemplates the control CPU 130 of FIG. 1, a typical combination of hardware and software could be a general purpose computer system with a computer program that, when loaded and executed, controls the computer system and a DVD player system similar to that shown in FIG. 1, such that it carries out the methods described herein. The present invention can also be embedded in a computer program product which comprises all the features enabling the implementation of the methods described herein, and which when loaded in a computer system, is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

We claim:

1. A method for enabling display of closed caption information during trick mode playback of a video presentation, the method comprising:
   identifying at least one picture in a segment of the video presentation, said at least one picture comprising at least one NUL character;
   deleting said at least one identified picture from said segment of said video presentation to accomplish trick mode playback of the video presentation; and
   providing a remaining portion of said segment of the video presentation containing the closed caption information to a display device for display at trick mode playback speed.

2. The method according to claim 1, wherein said identifying step further comprises the step of identifying said at least one picture from a group of pictures comprising said segment of the video presentation.

3. The method according to claim 2, further comprising the step of determining pictures within said group of pictures containing non-displayable control codes.

4. The method according to claim 3, further comprising the step of deleting said pictures within said group of pictures containing said non-displayable codes.

5. The method according to claim 4, further comprising the step of providing for display a remaining portion of said group of pictures for the video presentation containing the closed caption information at a trick mode playback speed.

6. The method according to claim 3, wherein said non-displayable code is one selected from the group consisting of display color attribute, font color attribute, and font style attribute.

7. A method for displaying a closed caption information during trick mode playback of a video presentation, the method comprising:
   deleting at least one picture contained in a segment of the video presentation to accomplish trick mode playback of the video presentation;
   assigning to a remaining portion of said pictures contained in said segment of the video presentation, closed caption information for display during playback of said segment of the video presentation; and
   displaying said assigned remaining portion of said segment of the video presentation containing the closed caption information at a trick mode playback speed.

8. The method according to claim 7, wherein said deleting step further comprises the step of deleting said at least one picture from a group of pictures comprising said segment of the video presentation.

9. The method according to claim 8, further comprising the step of determining pictures within said group of pictures containing non-displayable control codes and deleting those pictures containing non-displayable codes.

10. A system to enable display of closed caption information during trick mode playback of a video presentation, the system comprising:
    processing means for identifying at least one picture in a segment of the video presentation, said at least one picture comprising at least one NUL character;
    means for deleting said at least one identified picture from said segment of said video presentation to accomplish trick mode playback of the video presentation; and
    means for providing to a display a remaining portion of said segment of the video presentation containing the closed caption information for display at a trick mode playback speed.

11. The system according to claim 10, wherein said processing means further comprises means for identifying said at least one picture from a group of pictures comprising said segment of the video presentation.

12. The system according to claim 11, further comprising means for determining which pictures within said group of pictures contain non-displayable control codes.

13. The system according to claim 12, further comprising means for deleting said pictures within said group of pictures containing said non-displayable codes.

14. The system according to claim 13, wherein said providing means further comprises means for providing a remaining portion of said group of pictures for the video presentation containing the closed caption information for display at the trick mode playback speed.

15. The system according to claim 14, wherein said non-displayable code is one selected from the group consisting of display color attribute, font color attribute, and font style attribute.

16. An system for enabling display of closed caption information during trick mode playback of a video presentation, the system comprising:

means for deleting at least one picture contained in a segment of the video presentation to achieve trick mode playback of the video presentation;

means for assigning to a remaining portion of said pictures contained in said segment of the video presentation, closed caption information for display during playback of said segment of the video presentation at a trick mode playback speed; and means for providing to a display device said assigned remaining portion of said segment of the video presentation containing the closed caption information for display at the trick mode playback speed.

17. The system according to claim 16, wherein said segment is a group of pictures comprising the video presentation.

18. The system according to claim 17, further comprising means for determining pictures within said group of pictures containing non-displayable control codes and means for deleting said pictures containing said non-displayable control codes.

* * * * *